United States Patent Office 3,033,459
Patented May 8, 1962

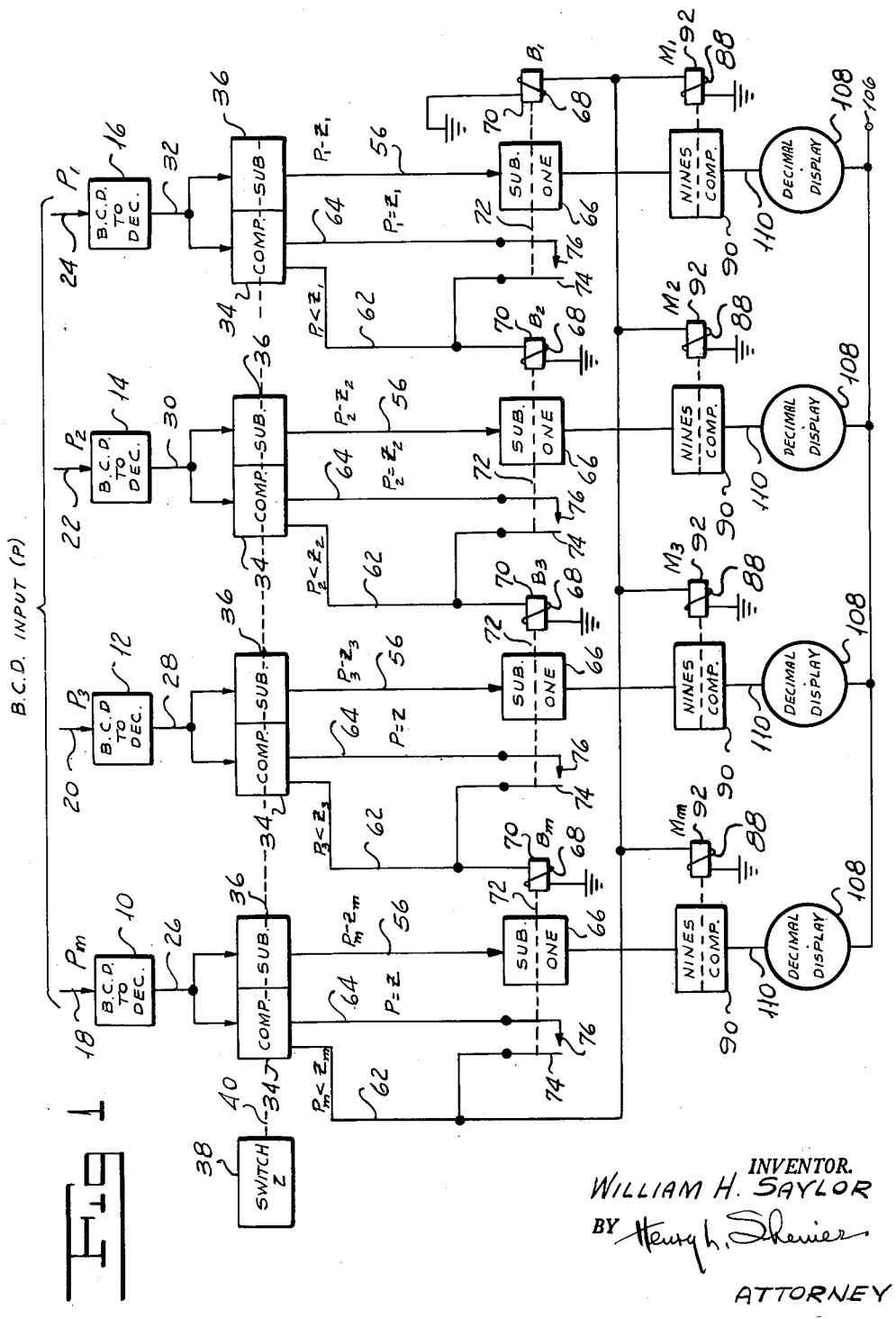

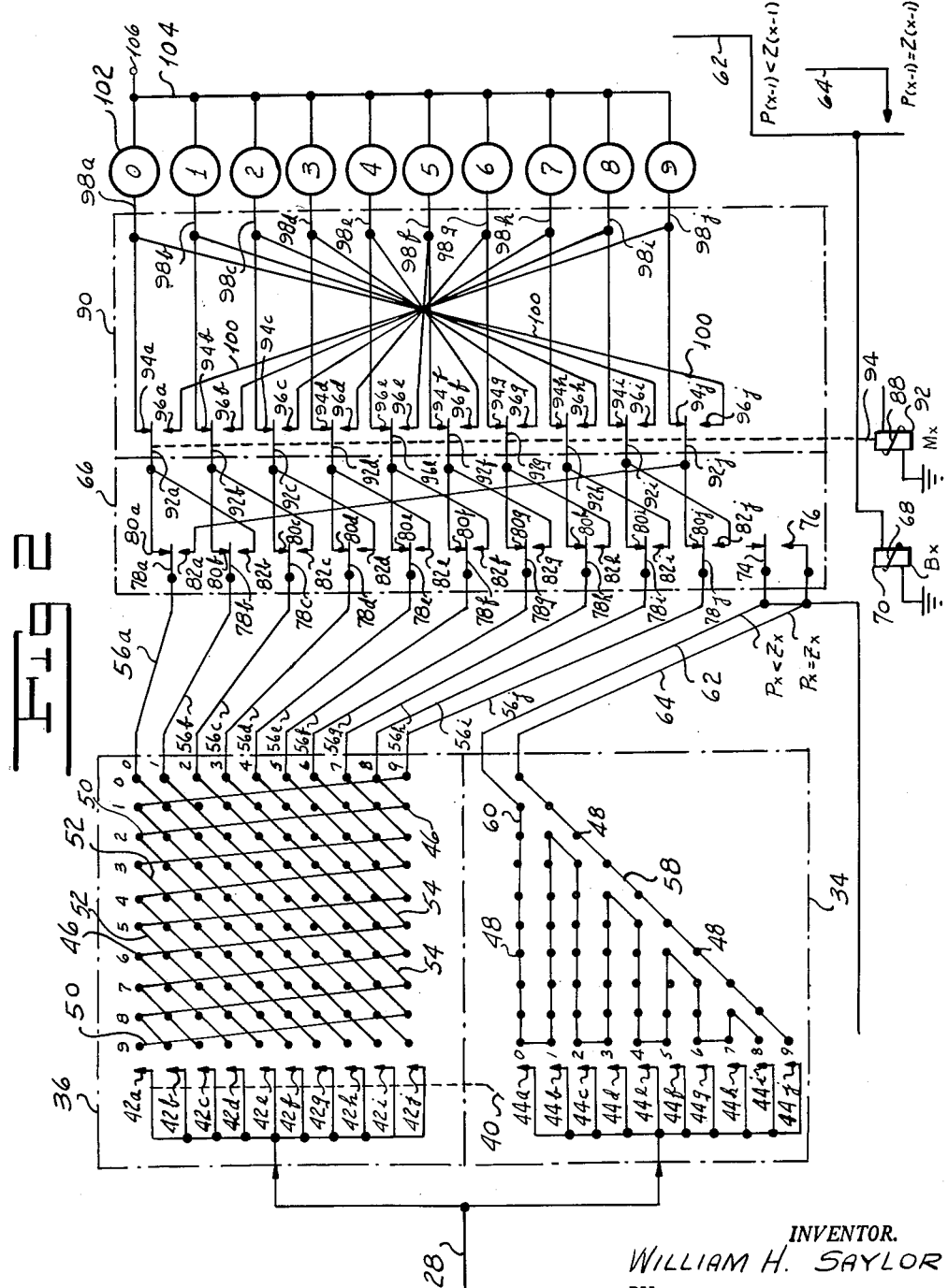

3,033,459
DECIMAL SUBTRACTOR
William H. Saylor, Corona Del Mar, Calif., assignor to United Aircraft Corporation, East Hartford, Conn., a corporation of Delaware
Filed Oct. 18, 1960, Ser. No. 63,359
6 Claims. (Cl. 235—168)

My invention relates to a decimal subtractor and more particularly to an improved decimal subtractor which is simple in construction in that it employs a small number of elements for accomplishing its intended result.

The copending application of George A. Person, Serial No. 805,620, filed April 10, 1959, discloses a Digital Zero Offset Position Indicator for indicating the difference between two decimal numbers which may, for example, represent the actual position P of a movable member and an adjustable zero position Z. In operation of the system shown in the copending application, a subtraction unit provides a decimal representation of the actual position number P less the zero offset position number Z digit-by-digit. A comparator produces a signal for each digit place representing whether the actual position digit for that place is greater than, is equal to or is less than the corresponding zero position digit. Using the comparator signals, a determination first is made of whether or not the actual position number is less than the zero position number. If the actual position number is greater than the zero position number all that remains to be done is to borrow one from places as required in response to comparator signals which indicate that the actual position number digit is less than the zero position number digit in a place. If, however, the actual position number is less than the zero position number than a plurality of "tens complement" generators are actuated to produce representations of the complements relative to the number ten of the respective digit representations of the subtractor output. In making the determination of whether or not the actual position number is less than the zero position number the system disclosed in the copending application employs auxiliary relays for carrying the comparison down from the most significant place to places of lesser significance where the two digits in the most significant place are equal.

When the tens complements have been generated in the case where the actual position number is less than the zero position number, a determination is made of whether one should be borrowed from any place in the tens complement representation. To accomplish this result, the system described in the copending application requires comparator outputs which indicate that the actual position number digit is greater than the zero position number digit in a place.

I have invented a decimal subtractor which embodies an improvement over the subtractor shown in the copending application. My subtractor does not require any auxiliary relays for making the determination that the actual position number is less than the zero position number when the most significant digits of the two numbers are equal. My improved subtractor does not require for its operation the generation of any comparator signals which indicate that the actual position digit is greater than the zero position digit in any place. Thus the comparator which forms a part of my decimal subtractor is simpler than is the comparator forming part of the subtractor shown in the copending application. It will be apparent that my decimal subtractor is substantially simpler than is the subtractor shown in the copending application.

One object of my invention is to provide a decimal subtractor which employs a small number of parts to accomplish its intended result.

Another object of my invention is to provide a decimal subtractor which does not require auxiliary relays for assisting in determining whether a number which normally is the minuend is less than the number which normally is the subtrahend.

A further object of my invention is to provide a decimal subtractor which does not require the generation of signals indicating that the digit in a place of what normally is the minuend is greater than the corresponding digit of the number which normally is the subtrahend.

Still another object of my invention is to provide a decimal subtractor which employs a relatively simple comparator.

Other and further objects of my invention will appear from the following description.

In general my invention contemplates the provision of a decimal subtractor in which a subtraction unit produces outputs representing the results of a digit-by-digit subtraction of a minuend and subtrahend. Where the minuend is greater than the subtrahend and if the minuend digit in a given place is less than the corresponding subtrahend digit, one is subtracted from the output of the subtraction unit in the next most significant place. Where the minuend is less than the subtrahend, one is subtracted from the subtraction unit output in the least significant place and in the next most significant places to those in which the minuend digit is less than the corresponding subtrahend digit. Further, after this operation takes place the nines complement or complement with respect to the number nine of all digit representations is generated to produce a representation of the difference between what normally is the minuend and the number which normally is the subtrahend.

In the accompanying drawings which form part of the instant specification and which are to be read in conjunction therewith and in which like reference numerals are used to indicate like parts in the various views:

FIGURE 1 is a schematic diagram showing the components of one form of my decimal subtractor.

FIGURE 2 is a schematic view illustrating the details of some of the components of the system shown in FIGURE 1.

Referring now to FIGURE 1 of the drawings, respective binary-coded-decimal inputs representing digits $P_m$, $P_3$, $P_2$, $P_1$, for example, of the actual position P of a member are applied to respective binary-coded decimal-to-decimal converters 10, 12, 14, and 16 through channels 18, 20, 22, and 24. One form of binary-coded decimal-to-decimal converter suitable for use in my subtractor is shown in detail in the copending application referred to hereinabove. As is explained more fully in the copending application, each of the converters 10, 12, 14, and 16 produces on its output channel 26, 28, 30, or 32 a signal indicating the decimal number representing that number encoded in the representation fed to the converter. Each of the channels such as channel 26 includes ten output conductors, only one of which carries the output signal.

I apply the signal on each of the channels 26, 28, 30, and 32 to a comparator 34 and to a subtraction unit 36. It will be seen that one comparator 34 and one subtraction unit 36 are associated with each of the converter output chanenls. A switch 38 is adapted to set the comparators 34 and subtraction units 36 to an arbitrarily selected zero position through a linkage 40.

Referring now to FIGURE 2 of the drawings, I have shown the details of one comparator 34 and one subtractor 36. By way of example, I have shown the comparator 34 and the subtraction unit 36 associated with the converter output channel 28. Subtractor 36 includes a plurality of brushes 42a to 42j. From the description given above, it will be apparent that only one of the brushes 42 carries a signal in response to the output of the converter 12. The comparator 34 includes a plurality of brushes 44a to 44j only one of which carries an output signal at any time in response to the output of converter 12. The linkage 40 is adapted to be actuated to move the brushes 42 and 44 respectively to engage a column of contacts 46 of the subtraction unit 36 and a column of contacts 48 of the comparator 34. It will be seen that each of the subtraction unit 36 and the comparator 34 has ten rows and ten columns of contacts. The columns of contacts 46 of the subtraction unit from left to right as viewed in FIGURE 2 correspond respectively to the digits from nine to one and to zero while the rows of contacts from top to bottom correspond to zero and to the digits one to nine respectively. Similarly, the columns of contacts 48 of the comparator 34 in a direction from left to right as viewed in the figure correspond to the digits nine to one and zero and the rows of contacts 48 from top to bottom as viewed in the figure correspond respectively to zero and to the digits one to nine.

Respective conductors 50 connect hte first to the ninth contacts 46 of the top row of contacts respectively to the second to tenth contacts of the bottom row of contacts 46. Respective conductors 52 connect the second to tenth contacts 46 of the first column of contacts to the second to tenth contacts of the top row of contacts. Conductors 54 connect the second to ninth contacts of the last column of contacts to the second to ninth contacts of the bottom row of contacts. With this arrangement, as will be explained hereinafter, with the brushes set to the representation of one digit and with one of the brushes carrying a signal representing another digit, the subtractor puts out a signal on one of a plurality of output conductors 56a to 56j connected to the last column of contacts to represent the difference between the digit represented by the signal on the brush and the digit represented by the position of the brushes.

A conductor 58 connects the bottom contact of the first column of contacts 48 to the last contact in the top row of contacts and it connects all intermediate contacts lying in the locus of a straight line in series. A conductor 60 connects all the contacts 48 to the left of conductor 58 as viewed in FIGURE 2 in series row by row. I connect conductor 60 to an output conductor 62 which is adapted to carry a signal representing the fact that the actual position digit for a given place is less than the zero position digit for that place. Similarly, I connect conductor 58 to an output conductor 64 adapted to carry a signal indicating that the actual position digit and the zero position digit for the place are equal.

Assuming that the zero position digit in a given place is four, for example, brushes 42a to 42j are moved to engage the column of contacts 46 corresponding to the digit four. Similarly the brushes 44a to 44j are moved to engage the column of contacts 48 corresponding to the digit four. In this condition of the brushes if the actual position digit for the place is two, brush 42c carries a signal and it can be seen that the output conductor 56i carries a signal indicating that the results of the subtraction operation in this place is the number eight. At the same time a signal is applied to the conductor 60 to cause conductor 62 to provide a signal indicating that the actual position digit is less than the zero position digit in this place. If, however, the actual position digit were eight so that brush 42i carries a signal, then an output signal is produced on conductor 56e indicating that the results of the subtraction operation is a four in this place. From these examples it will be seen that the subtraction unit 36 always subtracts the zero position digit from the actual position digit. If, as in the second example given above, the actual position digit is eight, then the comparator produces no output signal. That is, as will be apparent from the description hereinafter, my subtractor does not require that a signal be generated to indicate that the actual position digit or normal minuend digit is greater than the zero position digit or normal subtrahend digit in any place such as is required for the operation of the system shown in the copending application.

Referring again to FIGURE 1, I have indicated the comparator output conductors 62 and 64 and have shown the subtraction unit output conductors 56a to 56j as a channel 56. Since the output conductors and channels of the other comparators and subtraction units are similar, I have designated them by the same reference numerals as are used to indicate the output conductors and channel corresponding to the converter 12. I connect the channels 56 of the respective subtraction units 36 to a plurality of respective "subtract one" units 66. A plurality of respective relay windings 68 are connected between the output conductors 62 and ground. Whenever a winding 68 is energized, it operates its armature 70 to cause a linkage 72 to actuate the associated subtraction unit. It will be noted that I connect the conductor 62 corresponding to the most significant place to the winding 68 associated with the least significant place. I connect the conductors 62 corresponding to the other respective places to the windings 68 in the respective next most significant places. Thus when the conductor 62 corresponding to the most significant place carries an output signal, the winding 68 in the least significant place is energized. When any one of the other conductors 62 carries a signal, the winding 68 in the next most significant place to that carrying the signal is energized. As will be apparent from the description given hereinafter, it is in this manner that I accomplish borrowing operations in the next most significant place to that in which the minuend digit is greater than the subtrahend digit. Each winding 68 not only actuates its corresponding subtract one unit 66 but also it closes a normally open switch arm 74 on a contact 76. Each arm 68 is connected to the conductor 62 to which the subtract one unit 66 with which it is associated corresponds. I connect the respective conductors 64 to the contacts 76. If the actual position and zero position digits in the most significant places are equal, the conductor 64 carries a signal. If also the actual position digit is less than the zero position digit in the next least significant place, the switch arm 74 corresponding to the most significant place is closed on its contact 76 and the signal from the corresponding conductor 64 energizes the winding 68 in the least significant digit place. In any other place if the two digits are equal, the conductor 64 carries a signal and if the actual position digit is less than zero position digit in the next least significant place, then the winding 68 in next most significant place is energized.

Referring again to FIGURE 2, I have shown the details of the subtract one unit 66 associated with the converter 12. This unit 66 includes a plurality of respective switch arms 78a to 78j normally in engagement with upper contacts 80a to 80j and having lower contacts 82a to 82j associated therewith. I connect the conductors 56a to 56j to the respective switch arms 78a to 78j. When the winding 68 associated with this subtract one unit is energized as by a signal from either the conductor 62 or the conductor 64 of the next least significant digit comparator, it causes armature 70 to move arms 78a to 78j out of engagement with the contacts 80a to 80j and into engagement with the contacts 82a to 82j. It will be seen that the switch arms 78a to 78j and the normally engaged contacts 80a to 80j correspond respectively to zero and to the digits from one to nine. Respective conductors 86 connect the contacts 82b to 82j respectively to the contacts 80a to 80i. In this manner when the winding 68 is energized, it produces the effect of subtracting one from the decimal representation on one of the conductors 56a to 56j. For example, if conductor 56d carries a signal representing a three and switch arm 78d engages the contact 82d, the same effect is produced as if conductor 56c carrying an output representing a two were energized owing to the fact that a conductor 86 connects the contact 82d to the contact 82c. It will be remembered also that when the winding 68 is energized it draws arm 74 into engagement with arm 76 to send a signal to the winding 68 of the next most significant digit if either the actual digit is less than or is equal to the zero position digit. That is, if the comparator in a given place produces an output signal, the corresponding winding 68 of the next most significant place in all places save the most significant place is energized. If these conditions prevail in the most significant place, then the winding 68 in the least significant place is energized.

The structure described above illustrates the operation of my system in accounting for situations in which one must be borrowed from a next most significant place properly to perform the subtraction operation. It remains to produce the correct output in the event that the actual position number is less than the zero position number. Referring again to FIGURE 1, I connect a plurality of nines complement generators actuating windings 88 in parallel between the conductor 62 corresponding to the most significant place and ground. Each winding 88 is adapted when energized to actuate a nines complement unit 90 by operating its armature 92 to drive a linkage 94 which actuates the unit. It will be remembered that whenever either the most significant actual position digit is less than the most significant zero position digit or when these digits are equal and the winding 68 corresponding to the most significant place is energized, then the winding 68 corresponding to the least significant place is energized. Under the same conditions all the windings 88 are energized to actuate their associated nines complement generators. It is to be noted that the conditions just mentioned are those which indicate that the actual position number is less than the zero position number. Obviously, if the most significant actual position digit is less than the most significant zero position digit, then the actual position number is less than the zero position number. Similarly, if the most significant actual position digit and the most significant zero position digit are equal and the next most significant actual position digit is less than the next most significant zero position digit, then the actual position number is less than the zero position number. This logic follows through my system so that whenever the actual position number is less than the zero position number then all the windings 88, as well as the winding 68 in the least significant place, are energized. It will be appreciated that I accomplish this result without the use of auxiliary relays such as are required in the system shown in the copending application.

Referring again to FIGURE 2, I have shown the nines complement generator 90 corresponding to the next to most significant place. I connect the respective contacts 80a to 80j of the subtraction unit 66 to contact arms 92a to 92j of the generator 90. Arms 92a to 92j normally engage contacts 94a to 94j and they are adapted to be moved into engagement with contacts 96a to 96j upon the energization of the winding 88 associated with the generator. I connect the respective contacts 94a to 94j to output conductors 98a to 98j representing decimal outputs respectively of zero and of the digits one to nine. A plurality of conductors 100 connect contacts 96a to 96j to the output conductors 98a to 98j in such manner as to generate the "nines complement" of the output of the subtract one unit 66 whenever the winding 88 is energized. If, for example, a signal representing a two is supplied to the arm 92c and the winding 88 has been energized to move arms 92a to 92j into engagement with contacts 96a to 96j then a conductor 100 carries this signal to the output conductor 98h to represent a seven. I connect respective lamps 102 adapted to indicate zero and the digits from one to nine respectively between conductors 98a to 98j and a conductor 104 connected to the terminal 106 of a suitable source of potential.

Referring again to FIGURE 1, I have indicated the connection between the nines complement generators 90 and the decimal displays indicated by the reference character 108 and each including a plurality of lamps 102 by channels 110.

The operation of my decimal subtractor is best understood by considering specific examples. Let us assume as a first example that the actual position number P equals 5672 while the zero position number Z equals 2496. First the subtraction units 36 individually subtract the respective digits of the two numbers. Beginning with the least significant, it will be seen that the brushes 42a and 44a of the subtraction unit 36 and comparator 34 of the least significant place are in engagement with the column of contacts corresponding to the digit six. At the same time brush 42c and brush 44c both carry signals. Under these conditions output conductor 56g carries a signal indicating a difference of six while the conductor 62 carries a signal indicating that the least significant digit $P_0$ is less than the least significant digit $Z_0$. In the next most significant place the subtraction unit puts out an indication of a difference of eight. However, since the conductor 62 of the least significant place carries a signal, the winding 68 of the next to least significant place is energized so that the subtract one unit operates to put out a representations of seven rather than eight. In the next-to-most and the most significant places the subtraction units put out respectively representations of two and three. However, since the conductor 62 in the next-to-least significant place carries a signal, one is subtracted from the representation of the next-to-most significant place with the result that the resulting indication is that of a difference between the actual position number and the zero position number of 3176.

Let us now consider the case where the actual position number is less than the zero position number. For example, we will assume that the actual position number P equals 2496 while the zero position number Z equals 5672. In the least significant place the brushes 42a to 42j and 44a to 44j respectively engage a column of contacts 46 and a column of contacts 48, each of which corresponds to the digit two. At the same time brushes 42g and 44g carry signals. Under these conditions the subtraction unit 36 in the least significant place produces an output representation of four on the conductor 56e while the comparator 34 produces no output. The operation of the comparators and subtractors in the other places of significance is analogous with the result that the digit-by-digit subtraction of Z from P produces subtraction unit outputs representing 7284. Since the most significant actual postion digit $P_m$ is less than the most significant zero position digit $Z_m$, the conductor 62 in the most significant place carries an output signal which energizes the winding 68 in the least significant place and which energizes the windings 88 for operating the nines complement generators. As a result, first the subtract one unit 66 in the least significant place operates to cause a signal representing a three to be applied to the nines complement generator 90 in this place. This nines complement generator converts the representation of three to a representation of six. Since the least significant actual position digit $P_1$ is greater than the least significant digit $Z_1$, the winding 68 of the subtract one unit for the next-to-least significant place is not energized so that the representation of two is applied directly to the nines complement generator 90 in this place. The nines complement generator converts this representation to a representation of seven. Similarly, the subtract one unit actuating winding 68 in the next-to-most significant place is not energized and the representation of eight applied to the nines complement generator 90 in this place causes an output representation of one. Since the next-to-most significant actual position digit is less than the next-to-most significant zero position digit then the winding 68 in the most significant place is energized and one is subtracted from the representation of seven in this place to cause a representation of six to be applied to the most significant nines complement generator to produce an output representation of three resulting in an overall output representation of 3176. Any other examples of determining difference between two numbers can be followed through in an analogous manner and the correct result is produced without requiring either auxiliary relays or the generation of signals representing that the actual position digit is greater than the zero position digit in any place.

It will be seen that I have accomplished the objects of my invention. I have provided a decimal subtractor for determining the decimal difference between two numbers with a small number of parts. My subtractor does not require the generation of any signals representing that the actual position number is greater than the zero position number in any place. My system does not require the auxiliary relays for assisting in the determination that the actual position number is less than the zero position number.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A decimal subtractor for producing a representation of the decimal difference between a first number and a second number including in combination means providing representations of the digits making up said first and second numbers, means responsive to said digit representations for producing signals representing a digit-by-digit subtraction of the second number from the first number, means responsive to said digit representations for producing a comparison signal indicating that said first number is less than said second number, means adapted to be actuated to generate the complements with reference to the number nine of digit representation signals thereto, means for feeding said digit-by-digit subtraction signals to said complement generating means and means responsive to said comparison signal for actuating said complement generating means.

2. A decimal subtractor for producing a representation of the decimal difference between a first number and a second number including in combination means providing representations of the digits of said first and second numbers, means responsive to said digit representation for producing signals representing a digit-by-digit subtraction of the second number from the first number, subtract one means adapted to be actuated to produce a signal representing a subtraction of one from a digit representation embodied in a signal fed thereto, means coupling the least significant digit-by-digit subtraction signal to said subtract one means, means responsive to said digit representations for producing a comparison signal indicating that said first number is less than said second number, means adapted to be actuated to generate the complements with reference to the number nine of digit representation signals fed thereto, means for feeding the digit-by-digit subtraction signals from most significant to next-to-least significant and the output of said subtract one means to said complement generating means and means responsive to said comparison signal for actuating said complement generating means and for actuating said subtract one means.

3. A decimal subtractor for producing a representation of the decimal difference between a first number and a second number including in combination means providing representations of the digits of said first and second numbers, a plurality of respective means responsive to digit representations and each adapted to subtract respective digits fed thereto, means for applying representations of digits of corresponding significance of said first and second numbers to the respective subtraction means to subtract the second number digit from the first number digit, a plurality of respective comparators each adapted to produce an output indicating when one digit is less than the other digit and when the one digit is equal to the other digit, means for applying representations of digits of corresponding significance of the respective first and second numbers to said comparison means to cause each of said comparison means to produce an output indicating when the first number digit is less than the second number digit and when the first number digit is equal to the second number digit, a plurality of subtract one units each adapted to be actuated to produce a signal representing a subtraction of one from a digit representation embodied in a signal fed thereto, means for applying the outputs of the respective subtraction means to said subtract one means, means responsive to the output of said comparison means in a given place for actuating the subtract one unit in a place of next greater significance when the first number digit is less than the second number digit in said certain place and when the first number digit and the second number digit in said certain place are equal and the subtract one means in said certain place is actuated, respective means adapted to be actuated to generate the complement with reference to the number nine of a digit representation embodied in a signal fed thereto and means responsive to said comparison means for actuating said complement generating means and for actuating the subtract one means corresponding to the least significant place when the first number is less than the second number.

4. A decimal subtractor for producing a representation of the difference between a first number and a second larger number in response to representations of the respective digits of said number including in combination means responsive to said representations for producing signals representing digits resulting from a digit-by-digit subtraction of said second number from said first number, means responsive to said number digit representations for producing a signal indicating that a borrowing operation is to be performed in a given place, means responsive to said borrowing operation signal and to the subtraction signal in said given place for subtracting one from the digit represented by the subtraction signal in said given place, means for producing a comparison signal indicating that said first number is less than said second number, means responsive to said comparison signal and to the least significant subtraction signal for subtracting one from the digit represented by the least significant subtraction signal and means responsive to said comparison signal and to said subtraction signals including those from the representations of which one has been subtracted for producing signals representing the complements with reference to the number nine of the digits represented by said subtraction signals.

5. A decimal subtractor for producing a representation of the difference between a first number and a second larger number each having places of significance in response to representations of digits making up said numbers including in combination respective means responsive to the representations of said digits for producing subtraction signals representing the digits resulting from a subtraction of the second number digits from the first number digits in each place, respective means each responsive to the representations of said number digits for a given place for producing a first comparison signal indicating that said first number digit is less than said second number digit for said given place and a second comparison signal indicating that said first number digit is equal to said second number digit in said given place, respective subtract one means each adapted to be actuated to produce a signal representing a subtraction of one from the digit representation embodied in a signal fed thereto, means for feeding said subtraction signals respectively to said subtract one means, means responsive to the first comparison signal in a given place for actuating the subtract one means in a next most significant place, means responsive to the second comparison signal in a given place for actuating the subtract one means in the next most significant place when the subtract one means in said given place has been actuated, respective means each adapted to be actuated to produce a signal representing the complement with reference to the number nine of a digit representation embodied in a signal fed thereto, means for coupling said subtract one means to said complement producing means, means responsive to the first comparison signal in the most significant place for actuating the subtract one means in the least significant place and for actuating said complement producing means and means responsive to the second comparison signal in the most significant place for actuating the subtract one means in the least significant place and for actuating said complement producing means when the subtract one means in the most significant place has been actuated.

6. In a decimal subtractor apparatus for generating the complement with reference to the number nine of a digit representation embodied in a signal fed thereto including in combination a plurality of input channels corresponding respectively to the digits from zero to nine, a plurality of output channels corresponding respectively to the digits from zero to nine, respective means normally connecting said input channels to corresponding output channels and means adapted to be actuated to connect said input channels to respective output channels which correspond to the complement with reference to the number nine of said input channels.

No references cited.